United States Patent [19]

Becker et al.

[11] 4,399,082
[45] Aug. 16, 1983

[54] BLOWDOWN DEVICE FOR STEAM POWER PLANTS

[75] Inventors: Manfred Becker, Bad Homburg; Klaus Melchior, Frankfurt am Main, both of Fed. Rep. of Germany; Leonhard Slegers, Bethesda, Md.

[73] Assignee: Kraftwerk Union Aktiengesellschaft, Mülheim, Fed. Rep. of Germany

[21] Appl. No.: 228,963

[22] Filed: Jan. 27, 1981

Related U.S. Application Data

[63] Continuation of Ser. No. 26,521, Apr. 3, 1979, abandoned, which is a continuation of Ser. No. 845,369, Oct. 25, 1977, abandoned, which is a continuation of Ser. No. 655,692, Feb. 6, 1976, abandoned.

[30] Foreign Application Priority Data

Feb. 12, 1975 [DE] Fed. Rep. of Germany ....... 2505848

[51] Int. Cl.³ .............................................. B01F 3/04
[52] U.S. Cl. ............................ 261/124; 261/DIG. 10; 239/559; 376/283
[58] Field of Search ............... 261/124, 122, DIG. 13, 261/121 R, 123, DIG. 10, DIG. 32; 210/219 R, 221 R, 221 P; 239/557, 559, 567; 376/283, 293, 316

[56] References Cited

U.S. PATENT DOCUMENTS

| | | | |
|---|---|---|---|
| 662,403 | 11/1900 | Edson | 261/124 |
| 2,023,227 | 12/1935 | Henkel et al. | 261/DIG. 13 |
| 2,636,473 | 4/1953 | Schwartz et al. | 261/124 |
| 2,708,981 | 5/1955 | Armacost et al. | 261/123 |
| 2,869,844 | 1/1959 | Thomas | 261/124 |
| 3,103,788 | 9/1963 | Gross | 261/124 |
| 3,113,913 | 12/1963 | Newton | 176/37 |
| 3,242,072 | 3/1966 | Walker | 261/124 |
| 3,424,443 | 1/1969 | Thayer | 261/124 |
| 3,545,411 | 12/1970 | Vollradt | 261/DIG. 10 |
| 3,555,783 | 1/1971 | Grimshaw | 261/124 |
| 3,711,072 | 1/1973 | Waldenville | 261/122 |
| 3,926,810 | 12/1975 | Gudernatsch et al. | 261/124 |
| 4,086,308 | 4/1978 | Jurgens et al. | 376/283 |

FOREIGN PATENT DOCUMENTS 2305717 8/1974 Fed. Rep. of Germany .

Primary Examiner—Tim R. Miles
Attorney, Agent, or Firm—Herbert L. Lerner

[57] ABSTRACT

Blowdown device for steam power plants includes a tube extending into a volume of water, the tube being formed with a multiplicity of holes having a substantially uniform diameter for introducing, into the water, steam that is flowing in the tube, the holes being disposed in rows spaced one from another a distance equal to at least 2.5 times the diameter of the holes.

8 Claims, 5 Drawing Figures

BLOWDOWN DEVICE FOR STEAM POWER PLANTS

This is a continuation of application Ser. No. 026,521, filed Apr. 3, 1979, now abandoned, which is a continuation of Ser. No. 845,369, dated Oct. 25, 1977, now abandoned, which is a continuation of application Ser. No. 655,692, dated Feb. 6, 1976, now abandoned.

The invention relates to a blowdown device for steam power plants, especially for nuclear power plants, having a tube extending into a volume of water and formed with holes for introducing, into the water, steam flowing in the tube.

In a blowdown device heretofore known the German published non-prosecuted application DT-OS No. 2 305 717, the holes are universally distributed in an upper region of a ring tube having a circular cross section, the upper region encompassing 125° to 135° of the peripheral angle. In this heretofore known device, the contents of a cylindrical vessel, at the base of which the aforementioned ring tube formed with the holes is distributed, is supposed to be traversed as uniformly as possible by steam that is to be blown down.

In the invention of the instant application, a uniform distribution of the steam, that is to be blown down, over a given volume of water is also in fact advantageous, however, two problems, which were not even considered in the aforementioned German published non-prosecuted application are even more important.

They are:

1. If such a blowdown device is charged with steam through a rapidly opening valve (opening time $\approx 100$ milliseconds), the immersed tube must be blown free of water ("freeblown") before steam can be discharged into the water.

Due to the inertia of the water column, the air located initially between the valve and the water column is compressed.

The air expelled under excess pressure causes dynamic loads or stresses in the water region. These loads or stresses are greater, the shorter the opening time of the valve and the higher the steam throughput.

2. Conventional devices for condensing steam operate within a narrowly limited operating range with respect to steam throughput and temperature of the water condenser. During the use of such devices in steam power plants, especially nuclear power plants, the steam throughput fluctuates, however, more than one order of magnitude and the temperature of the water varies from cold to nearly the boiling limit. Within this onset or incipient range, violent condensation shocks or impacts can occur with undesired pressure fluctuations resulting therefrom.

It is accordingly an object of the invention of the instant application to provide a solution of both of the aforementioned problems, effectuated at minimal expense through purely passive measures.

With the foregoing and other objects in view, there is provided, in accordance with the invention a blowdown device for steam power plants comprising a tube extending into a volume of water, the tube being formed with a multiplicity of holes having a substantially uniform diameter for introducing, into the water, steam that is flowing in the tube, the holes being distributed in rows spaced one from another a distance equal to at least 2.5 times the diameter of the holes.

In the invention, due to the spacing of the rows of holes, between the streams or jets of steam introduced into the water, a flow of water can be established, as it were, in direct flow, but at least however, running laterally thereto, which assures a uniform condensation i.e. free of pressure fluctuation, even for high temperatures. The expense required therefor is considerably minimal because the disposition of the holes in the form of rows of holes demands virtually no increased cost to manufacture technically. From the standpoint of manufacturing technology, a peripheral slot compared with a row of holes could provide even less expense, however the mechanical strength or stability of the tube formed with such a slot is generally reduced without gaining other advantages thereby.

As mentioned hereinbefore, the spacing between the rows of holes can be more than 2.5 times the hole diameter. A blowdown device which has been installed for condensation chambers for boiling water reactors of high power output or capacity, namely of 2300 $MW_{th}$ (thermal megawatts), in accordance with another feature of the invention, has a hole diameter of substantially 10 mm and a spacing of the rows of holes from one another of substantially 50 mm, which have proven to be excellent. In such a case, of course, the spacing between the rows of holes is 5 times the diameter of the holes.

The holes should be oriented so that the direction in which the blowing therethrough occurs is laterally. This means, in accordance with a further feature of the invention, that the tube is formed with holes in a vertical region thereof, the holes having an axis extending largely in a horizontal direction. If the tube with its axis extends horizontally per se, the holes in the lateral region can extend over a peripheral angle ±45° to the horizontal plane. Accordingly, the region provided with the holes covers at most one-half of the periphery of the tube, in accordance with yet another feature of the invention. This has proven to be desirable for a smooth or calm condensation of the steam because the non-perforated region permits a disturbance-free flow of water thereto.

The holes in the rows of holes according to the invention can be provided in a vertically extending tube which extends into a volume of water in the heretofore conventional condensation chambers. Even more desirable, however, and in accordance with an added feature of the invention, a finer distribution is obtained, however, when a plurality of the tubes are fixed in stellar form to a common supply pipe. The star-forming tubes can be predominantly extended horizontally. Thus, two, three or more tubes can belong to one star which need not necessarily be symmetrical. The length and number of arms of the stars depends upon the factors of the water volume and the quantity of steam to be condensed.

The lateral disposition of holes in rows of holes is also desirable for the aforementioned "freeblown", wherein the air, as has been established in tests, is distributed in a desirable fashion and the pressure thereof is reduced. The previously observed pressure fluctuations are thereby avoided, which were caused by the formation of large gas bubbles existing under initially high excess pressure.

In accordance with yet another feature of the invention, the tube has a flow cross section, which is of such dimension with respect to that of the holes, that throughput through the holes is substantially 1000 kg per m² per second. Moreover, with this value, the power output or capacity occurring with the largest boiling water reactor heretofore conceived of, can be drawn off or discharged free of any disturbances. In this regard, and in accordance with an additional feature of the invention, the ratio of the total hole cross section to the flow cross section of the tube is 1:0.5 to 2.0.

The tube provided with holes can have various cross-sectional shapes as long as the rows of holes permit a definite "row-wise" flow. With respect to the availability and the price of the materials, one would, however, prefer cylindrical tubes. Thus, in accordance with a concomitant feature of the invention, the tube formed with the holes is cylindrical and has a wall closing off one of the ends thereof, the wall being also formed with holes concentrically.

In accordance with another feature of the invention, the holes define a preferred flow direction and set in motion a defined flow in the water surrounding the tube so that the introduction of heat into the water through the flow is standardized or rendered uniform.

Other features which are considered as characteristic for the invention are set forth in the appended claims.

Although the invention is illustrated and described herein as embodied in blowdown device for steam power plants, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawing, in which.

Figure 1:
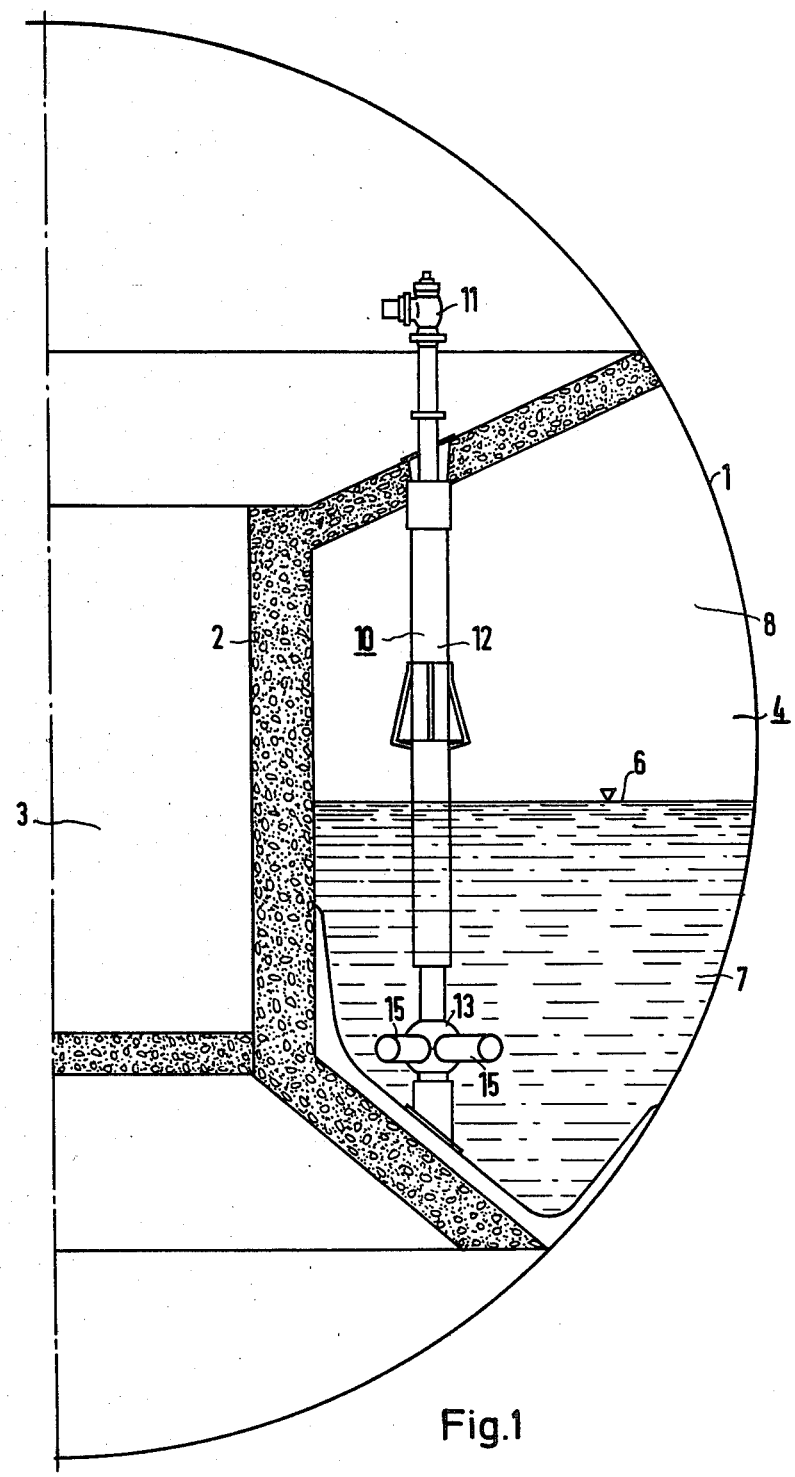
FIG. 1 is a partial sectional view of the safety shell or containment envelope for a nuclear reactor equipped with the blowdown device constructed in accordance with the invention.

Referring now to the drawing and first, particularly, to FIG. 1 thereof, there is shown, in partial sectional view, a steel spherical safety shell 1 of a boiling water power reactor, for example, of 3000 MW$_{th}$. In the interior of the safety shell 1, a concrete structure 2 is provided which surrounds a non-illustrated reactor pressure vessel that is located at the axis thereof within the reactor pit 3. A condensation chamber 4 is disposed annularly between the reactor pit 4 and the safety or containment shell 1 and is substantially half-filled with water. The volume of water 7 has a surface 6 at which it is separated from an airspace 8 located thereabove.

A number of blowdown devices, such as a row thereof, but of which only one blowdown device 10 is shown in FIG. 1, extend into the condensation chamber 4. All of the blowdown devices 10 are largely of the same or similar construction and include controllable valves 11 leading to the steam lines of the reactor pressure vessel, as well as blowdown lines 12 leading below the liquid level 6 to stellar hole nozzles 13, one of the hole nozzles 13 being shown in detail in FIG. 2 in enlarged scale. The hole nozzle 13 has four arms 15 which provide it with a star-shaped appearance, the arms 15 being of equal length but disposed at different angles to one another in a substantially horizontal plane. The different angles serve to accommodate or adjust to the non-uniformly distributed surrounding water volume 7.

Figure 3:
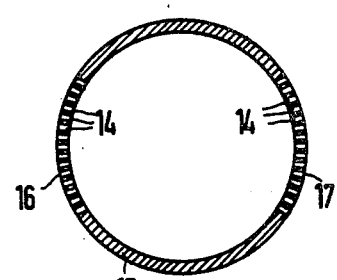
FIG. 3 is an enlarged cross-sectional view of FIG. 2 taken along the line III—III in direction of the arrows.
Figure 4:
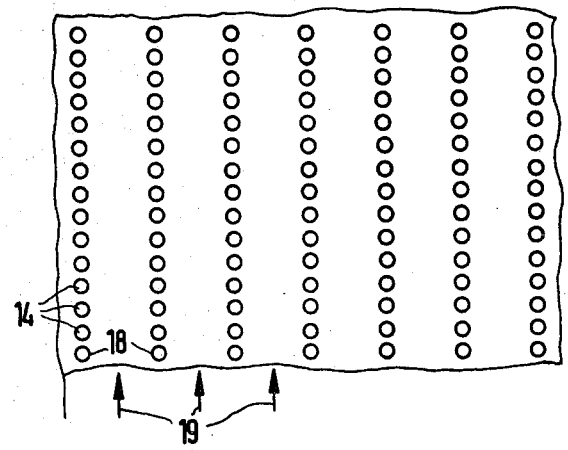
FIG. 4 is a fragmentary enlarged side elevational view of FIG. 3 showing the rows of holes formed in the hole nozzles.

As is shown in the cross-sectional view of FIG. 3, in the vertical regions 16 and 17 of the arms 15, at an angle of 63° symmetrically to a horizontal plane, respective fifteen holes 14 having a diameter of 10 mm are disposed in vertically extending rows. The hole rows 18 are spaced 50 mm from one another, as shown in FIG. 4. Therefore, water can travel in direction of the arrows 19 between the hole rows 18 in so-called water passages, while the steam flows out of the holes 14 perpendicularly thereto and entrains the water. Thus, condensation occurs in the joint flow process.

Figure 2:
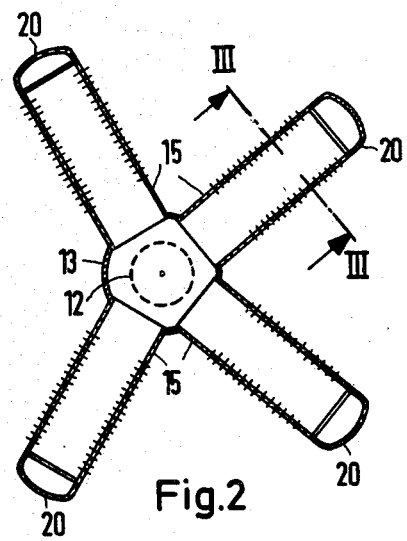
FIG. 2 is a fragmentary enlarged cross-sectional view of FIG. 1 taken along the line II—II in direction of the arrows and showing the hole nozzles of the invention.
Figure 5:
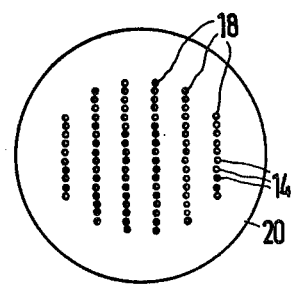
FIG. 5 is an enlarged end view of a cap of one of the arms of the hole nozzles of the invention.

FIG. 2 clearly shows caps 20 which close the free ends of the arms 15 that are fixed to the supply pipe or blowdown line 12. In two of these caps 20, as shown in FIG. 5, the holes 14 are disposed in the form of rows so that, in the volume of water 7 of the condensation chamber 4, a unidirectional flow exists. This flow provides for an improvement in the intermixing of steam and water and thereby for uniform heating of the water condenser.

There are claimed:

1. In a steam power plant, in combination, a water chamber and a blowdown device comprising at least one substantially straight tube having a longitudinal axis and disposed substantially horizontally in a volume of water received in said water chamber, said tube having a substantially circular cross section and being formed with a multiplicity of holes having a substantially uniform diameter for introducing, into the water received in said water chamber, steam that is flowing in the tube, all of said holes being located within a limited area of the peripheral surface of said tube, said area extending in longitudinal direction of said tube over a major part of the length thereof, said holes being disposed mutually aligned on respective diametrically opposite sides of said tube in circumferential rows spaced one from another a distance equal to at least 2.5 times the diameter of the holes, said circumferential rows respectively spanning a circular arc segment of less than 90°, the holes of said circumferential rows being substantially equal in number above and below a horizontal plane passing through said longitudinal axis of said tube, the spacing between mutually adjacent rows of said holes being greater than the spacing between mutually adjacent holes in the respective rows of said holes on each of said opposite sides of said tube, and said limited area of the peripheral surface of said tube being located at sides of the tube whereat each of the holes at the middle of the respective circumferential rows of holes has an axis extending in horizontal direction.

2. Blowdown device according to claim 1 wherein the diameter of the holes is substantially 10 mm and the spacing between the respective rows of holes is substantially 50 mm.

3. Blowdown device according to claim 1 wherein the region formed with said holes covers at most one-half of the periphery of said tube.

4. Blowdown device according to claim 1 wherein a plurality of said tubes are fixed in stellar form to a common supply pipe.

5. Blowdown device according to claim 1 wherein said tube formed with said holes is cylindrical and has a wall closing off one of the ends thereof, said wall being also formed with additional holes disposed in vertical rows spaced from one another, the spacing between mutually adjacent rows of said additional holes being greater than the spacing between mutually adjacent additional holes in the respective rows of said additional holes.

6. Blowdown device according to claim 1 wherein two of said tubes extend from a common supply pipe at nearly opposite locations of the peripheral surface thereof.

7. Blowdown device according to claim 1 wherein said tube has a flow cross section which is of such dimension with respect to that of said holes that throughput through said holes is substantially 1000 kg per $m^2$ per second.

8. Blowdown device according to claim 7 wherein the ratio of the total hole cross section to the flow cross section of said tube is 1:0.5 to 2.0.

* * * * *